Dec. 25, 1956 W. RENOUF 2,775,358
RIM AND WHEEL CARRIER
Filed Nov. 27, 1953 2 Sheets-Sheet 2
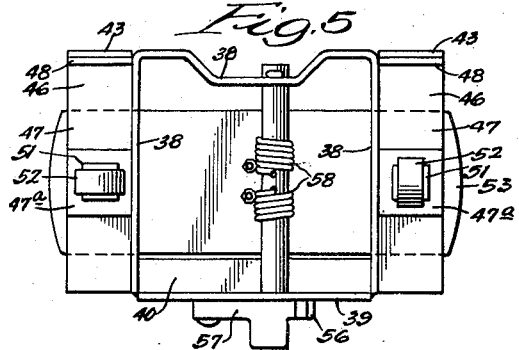
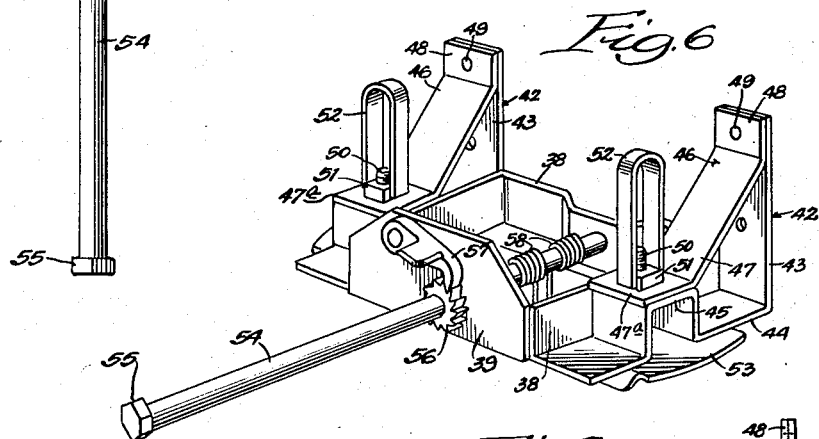
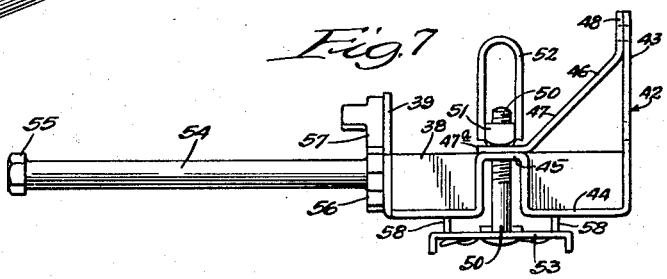
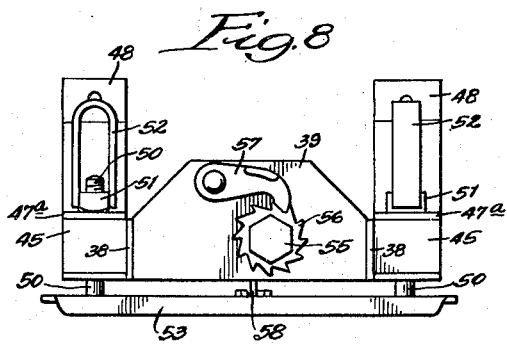
INVENTOR:
William Renouf,
BY
Dawson, Tilton & Graham,
ATTORNEYS.

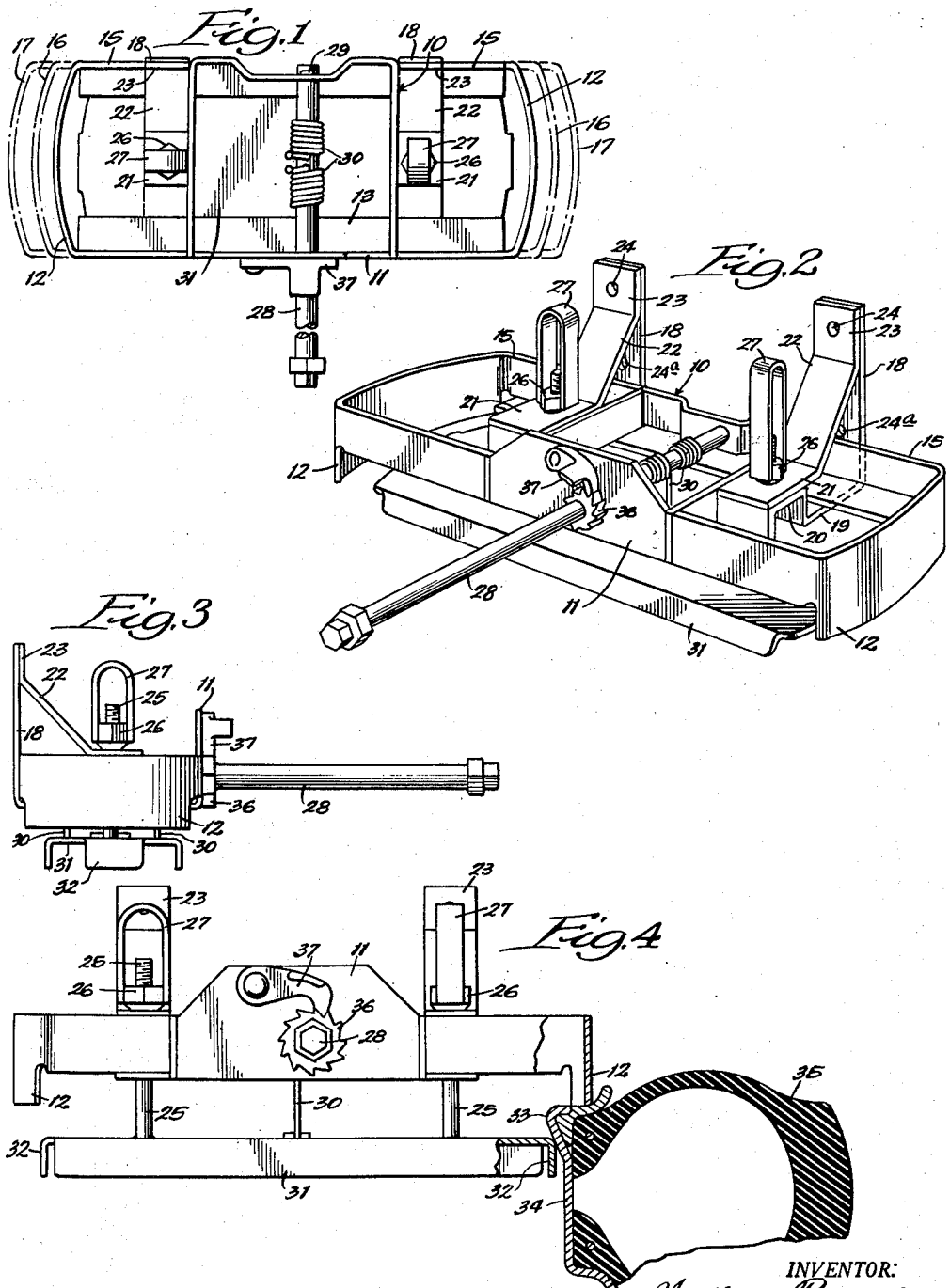

United States Patent Office 2,775,358
Patented Dec. 25, 1956

2,775,358

RIM AND WHEEL CARRIER

William Renouf, Wilmette, Ill., assignor to Nash Bros. Co., Evanston, Ill., a corporation of Delaware Application November 27, 1953, Serial No. 394,554

8 Claims. (Cl. 214—451)

This invention relates to a tire and wheel carrier. The invention is particularly useful in connection with heavy tires and wheels employed by large trucks and other vehicles.

It is well known that the tires or wheels of certain trucks are of extremely heavy weight and are dangerous to handle. In securing such structures below the body of the vehicle, or adjacent one side thereof, it is necessary to have some structure such as a ratchet-equipped shaft equipped with cables which may be rotated to lift the wheel or tire rim to a position where it may be secured below the truck or other vehicle, etc. It is of extreme importance that the operation of lifting and securing the wheel or rim be accomplished by a single operator and that it be accomplished with a minimum of danger, the wheel or rim being safely and quickly secured in position. It is also of considerable importance that the structure be strong enough to support the heavy weight while at the same time a minimum of metal be employed so as not to substantially increase the weight of the vehicle.

An object of the present invention is to provide a structure meeting the above requirements and permitting safe and quick securing of the wheel or tire-equipped rim below the carrier on the vehicle. A further object is to provide in such a structure sturdy means employing a minimum of metal for raising the rim or wheel and then locking it in position, the entire operation being accomplished by a single operator. Yet a further object is to provide a sturdy structure of relatively light weight which may be secured upon a vehicle and equipped with cable means for raising a tire or wheel, the structure being such that a single operator or driver can readily raise the heavy structure or readily lower it when the tire or wheel is to be removed. Other specific objects and advantages will appear as the specification proceeds.

The invention is shown, in illustrative embodiments, by the accompanying drawings, in which—

Figure 1 is a broken, top plan view of a carrier structure embodying my invention; Fig. 2, a perspective view of the structure shown in Fig. 1; Fig. 3, an end view in elevation; Fig. 4, a broken, side view in elevation, showing the carrier in position for supporting the tire or rim and anchoring it in position; Fig. 5, a top plan view of a modified form of the invention; Fig. 6, a perspective view of the structure shown in Fig. 5; Fig. 7, a side view in elevation; and Fig. 8, a front view in elevation of the structure shown in Figs. 5, 6 and 7.

In the form of the structure shown in Figs. 1 to 4, inclusive, 10 designates an upper frame member which is substantially U-shaped, as illustrated in Fig. 1. A front wall 11 closes the forward side of the U-shaped member 10 and then extends laterally at each end and is provided with a depending skirt portion 12. The wall 11 is braced along its inner side by a longitudinal flange 13. The strip 12 which provides the depending skirt is turned at its rear side to provide a rear wall 15 abutting the U-shaped member 10, as shown more clearly in Fig. 1. It will be understood that the front wall 11 may be elongated to provide a carrier of different lengths, as indicated by the dotted lines 16 and 17, thus adapting the carrier to tires of different widths. Thus, by using bars 11 of different lengths and bending them as shown, the carrier may be elongated as indicated by the dotted lines 16 and 17.

In order to provide an extremely sturdy support for receiving the weight of the tire being lifted, I provide a metal strap having a vertical leg 18 and at its bottom a horizontal leg 19, and an inverted U portion 20. The diagonal brace 22 has a horizontal leg 21, welded to the horizontal section of inverted U member 20 and a portion 23 abutting the vertical leg 18. The horizontal leg 19, together with its central inverted-U portion 20, may be welded, or otherwise secured, along its inner edges to the adjacent side of frame 10 to secure the strap thereto. The members 23 and 18 are preferably apertured at 24 to receive a securing bolt and member 18 is similarly apertured at 24a. Bolts extending through the two straps described provide a means for securing the carrier rigidly upon a truck or other vehicle.

The two strap portions 21 and 19 are provided with aligned apertures to receive the bolt 25, and a nut 26 is provided for threadedly engaging the upper threaded end of the bolt 25. The nut 26 is preferably provided with an elongated U-shaped strap 27 which facilitates the turning of the nut upon the bolt 25 and, if desired, a bar may be inserted through the U-shaped member 27 to tighten the nut 26 upon the bolt 25.

A shaft 28 is rotatably mounted on the carrier, extending through aligned openings in the front wall 11 and the rear wall of the member 10. At its rear, the shaft 28 is provided with a key or stop 29. Looped through holes in the shaft 28 within the carrier is a cable 30 which has free end portions which may extend downwardly to raise or lower the rim-engaging bar 31. The rim-engaging bar or plate 31 is elongated and is provided with end portions 32 adapted to be brought into engagement with the upper inwardly-turned portion 33 of the tire rim 34 carrying the tire 35. The shaft 28 is preferably provided with a ratchet gear 36 adapted to be engaged by a pivoted pawl 37.

In the operation of the structure shown in Figs. 1 to 4, inclusive, the carrier frame is mounted upon a truck or other vehicle, bolts being passed through the openings 24 in the straps 23 and 18 and into the side wall of the truck frame, beam, or other member. If desired, the carrier may be welded upon the truck frame.

In order to lift a tire which may lie upon the roadway below the truck, the pawl 37 is raised and the shaft 28 rotated to lower the bar or plate 31 to a position adjacent the tire. The plate 31 is then tilted to bring the plate below the flange portion 33 of the rim 34 and the plate then assumes its position with the two ends engaging the flange portion 33. A crank handle applied to the hexagonal outer end of the shaft 28 now permits the shaft to be rotated so as to raise the plate 31 and the tire-equipped rim 34 into the position shown in Fig. 4. The shaft 28 is rotated to bring the rim 34 snugly against the depending skirt 12 of the carrier frame so as to thus firmly lock the rim in a tight position between the plate 31 and the skirt 12 of the frame. At the same time, as the plate 31 is raised, the bolts 25 are passed through the openings in the strap portions 19 and 21 and the nuts 26 are then screwed into position so as to draw and hold the parts in a rigid, firm relation. A bar may be inserted within the U-shaped nut straps 27 to draw the nuts 26 into tight position.

To lower the tire rim, the reverse of the operations described may be followed. The nuts 26 are loosened and removed, while the plate 31 is lowered to the ground and then tilted to separate it from the tire rim 34. The plate 31 may then be secured within the rim of the old tire which has been removed, and the old tire may be raised and locked in position as above described.

The structure shown in Figs. 5 to 8, inclusive, is similar to that already described in connection with Figs. 1 to 4, inclusive, except that there is no extended frame portion for engaging the tire rim. The structure shown in Figs. 5 to 8, inclusive, is particularly useful in raising a wheel equipped with a plate having spaced openings therein.

In the structures shown in Figs. 5 to 8, inclusive, I provide a U-shaped member 38 closed at its front with a vertical wall 39. Horizontal flange 40 braces the front wall 39.

At each side of the U-shaped member 38 is a strap support structure which will now be described. The strap support structure 42 comprises a rear vertical leg 43 and a horizontal leg 44, the leg having an inverted U-shaped central portion 45. The horizontal leg, and its central inverted-U portion 45, is secured to the adjacent frame wall 38 by welding or by other suitable means. A strap 46 has a horizontal portion 47a resting upon the inverted portion 45 and connected by the inclined leg 47 to a vertical portion 48 abutting the leg 43. The portions 48 and 43 are provided with an aperture 49 for receiving a bolt by which the structure may be secured to a truck or other vehicle. The strap portion 47a and the portion of plate 44 therebelow are apertured to receive a bolt 50 threaded at its upper end and engaging a nut 51. An elongated inverted U-shaped strap 52 is welded to the nut 51.

Each of the bolts 50 extend through an elongated lifting bar or plate 53 and are preferably welded thereto.

For lifting the plate 53, I provide a rotatable shaft 54, rotatably mounted in openings in the front wall 39 and the rear wall of the U-shaped member 38. The shaft 54 is provided at its front end with a hexagonal head 55 permitting the shaft to be thus rotated with a suitable wrench, etc. The shaft 54 is also provided with a fixed ratchet gear 56 engageable with a pivoted pawl 57. Cable 58 is looped through holes in shaft 54 and its lower free ends clamped to the lifting bar or plate 53 by means of small U-bolts.

In operation, when it is desired to lift a wheel to a position below the carrier, the nuts 51 are removed and the shaft 54 rotated, with the pawl 57 raised to permit the bar 53 to be lowered to a position adjacent the wheel. The bar 53 is inserted within the opening of the wheel and the bolts 50 are passed through diametrically-disposed wheel holes. The shaft 54 is then rotated to wind the cable 58 to bring the wheel up to a position against the lower part of the carrier frame. In this position, the bolts 50 are brought through the openings in the strap portions 47 and 44, and the nuts 51 are screwed tightly in position, thus locking the vehicle wheel tightly in position.

In the foregoing operation, it will be noted that a minimum of effort is required on the part of the driver or operator. It is merely necessary to pass the bar 53 through the opening of the wheel therebelow and to bring the studs or bolts 50 through the wheel holes. Then as the shaft 54 is rotated, the bolts 50 are guided through the openings in the strap portions 47 and 44 and the nuts 51 are tightened into position. All of this can be accomplished readily by the truck or vehicle driver, without requiring any assistance, and in a very brief interval of time.

In the foregoing structure, considerable weight of the carrier has been eliminated through the use of the strap structure shown, while at the same time a very sturdy structure is provided and one which enables the truck driver to handle extremely heavy wheels with safety and expedition. As the driver rotates the shaft 54 to bring the bolts 50 within the openings of the strap portions 45 and 47a, he can quickly thread the nuts 51 upon the protruding portions of the bolt 50 and then tighten the nuts to secure the parts firmly into position.

While, in the foregoing specification, I have shown specific structures in considerable detail for the purpose of illustrating the invention, it will be understood that such details of structure may be varied widely by those skilled in the art without departing from the spirit of my invention.

I claim:

1. A carrier structure, comprising a perimetric frame, a shaft rotatably mounted in said frame, cables secured to said shaft and extending through said frame member, a lifting bar secured to the ends of said cables and equipped with bolts having upper threaded ends, a suspension support for said frame comprising a strap having a vertical portion extending to the rear of said frame and forwardly across said frame and having an inverted U portion within said frame providing a vertical guide channel open at its lower end, and a diagonal connecting the vertical portion of said strap and said inverted U portion, said brace and strap at said inverted U-shaped portion being apertured to receive a bolt carried by said bar and a nut engaging the upper threaded portion of the bolt for securing the same within said strap and brace member.

2. The structure of claim 1, in which at least two supports are employed for supporting the frame.

3. In combination with a carrier comprising a perimetric frame, a shaft rotatably mounted therein, cables secured to said shaft and a lifting bar secured to the ends of the cable, a support for said frame comprising a strap member extending below said frame and vertically behind the rear thereof, said strap member being bent upwardly to provide a flat platform generally aligned with the top of said frame and providing a vertical guide channel open at its lower end, a brace member having a flat portion extending over said platform and then extending diagonally upwardly and having a flat portion abutting the top portion of the strap, the aligned portions of said brace and platform being apertured to receive the threaded end of a bolt carried by said lifting bar, and the upper ends of said brace and strap being apertured to receive means for securing the support to the wall of a vehicle.

4. In combination with a carrier comprising a perimetric frame, a shaft rotatably mounted therein, cables secured to said shaft and a lifting bar secured to the ends of the cable, a support for said frame comprising a strap member extending below said frame and vertically behind the rear thereof, said strap member being bent upwardly to provide a flat platform generally aligned with the top of said frame and providing a vertical guide channel open at its lower end, a brace member having a flat portion extending over said platform and then extending diagonally upwardly and having a flat portion abutting the top portion of the strap, the aligned portions of said brace and platform being apertured to receive the threaded end of a bolt carried by said lifting bar, and the upper ends of said brace and strap being apertured to receive means for securing the support to the wall of a vehicle, and a nut having a loop handle portion adapted to threadedly engage the upper portion of a bolt extending through said platform and brace.

5. A tire carrier, comprising a pair of spaced supports, a perimetric open frame between said supports and secured thereto, a shaft rotatably mounted in said frame, cables fixed to said shaft, a lifting bar secured to the lower ends of said cables, each of said supports consisting of a strap member having a rear vertical portion for attachment to a vehicle wall and having a lower portion extending across said frame, said lower portion being bent upwardly at an intermediate point to form a raised platform and providing a vertical guide channel open at its lower end, a brace member having a portion resting upon said platform and its upper portion abutting the top portion of said strap, said platform and brace having an aligned aperture therethrough for receiving a bolt carried by said lifting bar, and nuts engaging the bolts extending through said supports.

6. A tire carrier, comprising a plurality of loop supports, said loop supports each comprising a strap having a rear portion extending in a vertical plane and a lower horizontal portion extending in a horizontal plane, said lower portion having an inverted U-shaped portion at an intermediate point providing a platform and providing a vertical guide channel open at its lower end, a diagonal brace having a horizontal portion resting upon said platform and a vertical portion resting against said rear strap portion, each of said supports having an aperture extending through the platform and the brace thereabove, a perimetric frame anchored to said supports and providing an open space therebetween, a shaft rotatably mounted in said frame, cables secured to said shaft within said frame and depending therefrom, a lifting bar secured to the ends of said cables, bolts carried by said bar and having threaded portions adapted to extend through the apertures in said supports, and nuts engaging the upper ends of said bolts and adapted to rest upon the brace and platform portions.

7. The structure of claim 6, in which the nuts are equipped with elongated loop handles.

8. The structure of claim 6, in which the frame is elongated beyond the supports and is equipped at its ends with depending skirts adapted to engage a tire when the tire is lifted to anchor the tire in position.

References Cited in the file of this patent

UNITED STATES PATENTS

| | | |
|---|---|---|
| 1,761,916 | Hebner | June 3, 1930 |
| 1,803,938 | Jantsch | May 5, 1931 |
| 1,983,767 | Mueller | Dec. 11, 1934 |
| 2,661,130 | Evans | Dec. 1, 1953 |